UNITED STATES PATENT OFFICE.

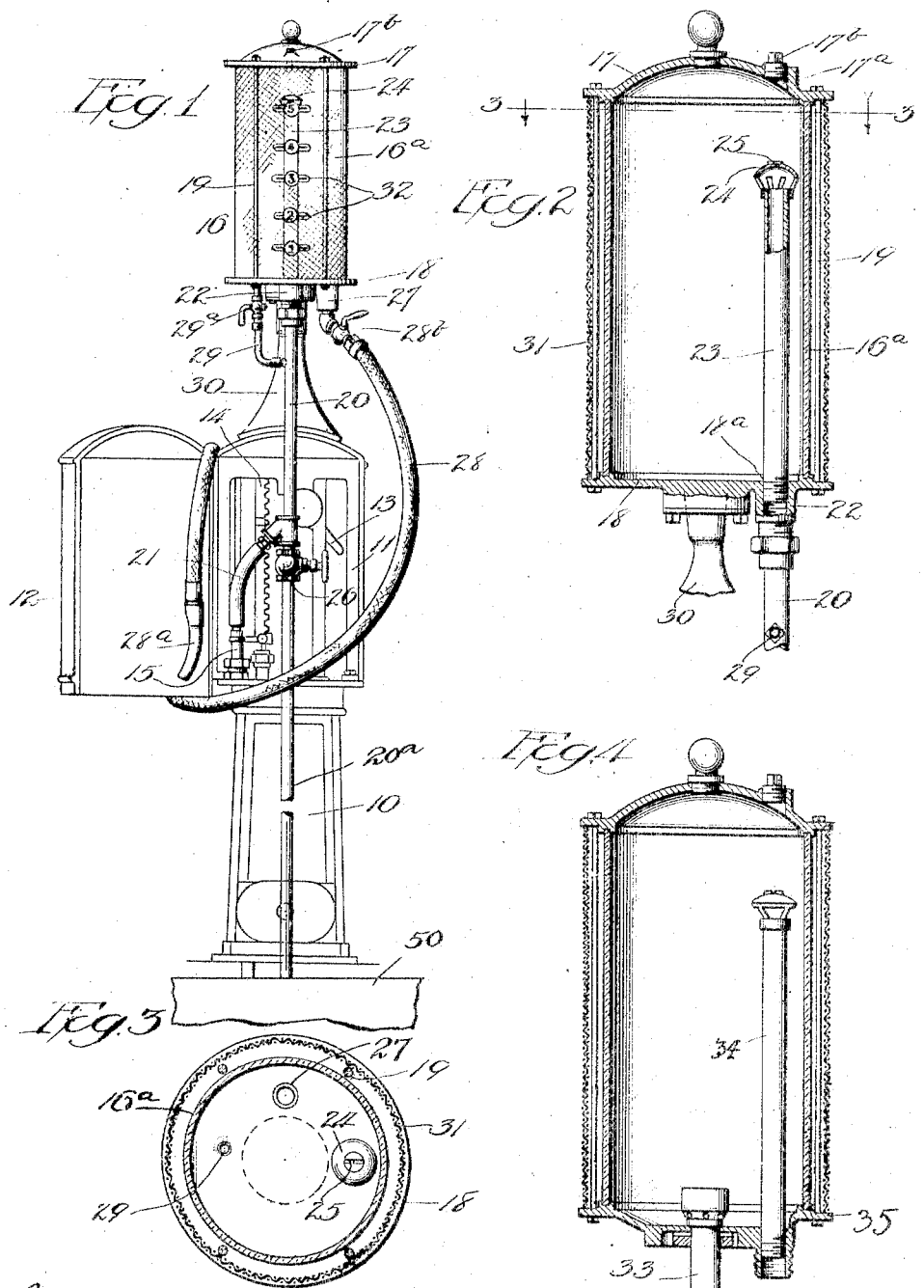

JOSEPH J. GROETKEN, OF AURORA, ILLINOIS.

LIQUID-DISPENSING APPARATUS.

1,372,071.    Specification of Letters Patent.    Patented Mar. 22, 1921.

Application filed March 17, 1919. Serial No. 283,150.

*To all whom it may concern:*

Be it known that I, JOSEPH J. GROETKEN, a citizen of the United States, residing at Aurora, in the county of Kane and State of Illinois, have invented certain new and useful Improvements in Liquid-Dispensing Apparatus, of which the following is a specification.

This invention relates to improvements in liquid dispensing apparatus, and more particularly to so-called visible measuring attachments for gasolene pumps and the like.

One object of the invention is to simplify and cheapen the construction of attachments of this character, while other objects and advantages thereof will become apparent from the following description taken in connection with the accompanying drawings, wherein two embodiments of the invention are illustrated.

Figure 1 is a front elevation of a gasolene pump of a well known type, showing the improved measuring attachment mounted in operative position thereon;

Fig. 2 is a vertical sectional view taken through the measuring attachment;

Fig. 3 is a sectional view taken on the line 3—3 of Fig. 2; and

Fig. 4 is a vertical sectional view similar to Fig. 2 showing a slightly modified form of attachment.

The measuring pump shown in Fig. 1 of the drawings is of a common type and well known to those skilled in the art, and the pumping and measuring mechanism thereof is therefore not illustrated in detail, as it forms no part of the present invention. Generally speaking, said pump comprises a combined casing and supporting standard 10, which houses the mechanism for delivering measured quantities of liquid from the storage tank (not shown), said casing being surmounted with the usual construction of skeleton design designated generally as 11, which structure provides an inclosure and support for the various exposed parts of the pump and its operating mechanism. Attached to one side of this portion 11 of the pump are a plurality of laterally swinging doors 12, which, when closed, provide a complete housing for the parts of the pump which project above the casing 10 thereof. The pumping and measuring mechanism is operated by a suitable crank 13, the quantities being indicated on a rack scale 14, and the liquid being delivered through a discharge pipe 15.

The improved measuring attachment which forms the basis of the present application is designated generally as 16 and comprises a cylinder 16ª of glass or other transparent material clamped between top and bottom plates 17 and 18, respectively, by means of the elongated bolts 19, to form a measuring vessel into which the gasolene or other liquid is pumped upon manipulation of the crank 13 prior to the delivery of said liquid to the purchaser. The supply pipe for the vessel is designated as 20 and may be connected to the discharge pipe 15 of the pump in any suitable manner, preferably by means of a flexible connection such as shown at 21, said pipe 20 at its upper end being screw-threadedly connected to the annular flange 22 which depends from the bottom plate 18 of the measuring vessel around the opening 18ª therein. Also screw-threadedly connected to this flange 22 of the measuring vessel, and extending upwardly therefrom into said vessel to a point near the top plate 17 thereof, is what may be conveniently termed a stand pipe 23, said pipe by reason of its position and connection just described providing a continuation of the supply pipe 20, so that the liquid pumped into said vessel will be supplied thereto through the upper end of said stand pipe 23, which is provided for this purpose with an apertured cap 24, the upper surface of said cap being provided with a slot 25, so that by means of a screw-driver, or other suitable tool, the stand-pipe 23 may be adjusted longitudinally within the vessel to the desired position. In order to render the slot in the top of the pipe 23 accessible for purposes of adjustment, a suitable opening 17ª is provided in the top plate 17 of the measuring vessel immediately above the top of the stand pipe 23, said opening 17ª being normally closed by a suitable removable plug 17ᵇ.

From the point at which the flexible connection 21 is tapped into the supply pipe 20, said pipe extends downwardly as at 20ª and is connected at its lower end to the storage tank 50, and intermediate said connection 21 and said tank 50 is provided with a suitable valve 26. By closing this valve and operating the crank 13 of the pump, it will be observed that liquid will be supplied to the measuring vessel through the connection 21, pipe 20 and stand-pipe 23. Assuming now that the supply of liquid to said vessel has risen to a level above the level of the upper open end of the stand pipe 23, it will be observed that by ceasing the pumping operation and opening the valve 26 the amount of gasolene above said level will be quickly drained back into the storage tank through stand-pipe 23, and pipes 20 and 20ª. Thus it will be observed that a common supply and overflow pipe for the attachment is provided, thereby greatly simplifying the construction and rendering it comparatively cheap to manufacture.

A suitable outlet 27 for the measuring vessel is also provided in the base plate 18 thereof, and to this outlet is attached the usual delivery hose provided with the usual discharge nozzle 28ª and cut-off valve 28ᵇ. By means of this flexible delivery hose 28 the supply of gasolene in the measuring vessel, after the quantity thereof has been definitely determined, may be conveyed into the fuel tank of an automobile or other receiving receptacle. At 29 there is illustrated a small drain pipe, also provided with a valve 29, said pipe being connected to the supply pipe 20 at one end and to the measuring vessel at its other end. By means of this drain pipe and associated valve any portion of the liquid within the measuring vessel may be drained back into the storage tank, thus rendering it possible to measure smaller quantities of gasolene than are measured by the normal operation of the device. It will also be observed, in the event the fuel tank will not hold the full measured quantity of gasoline, that the portion which remains in the measuring vessel after the valve 28ᵇ has been closed may be readily and quickly drained back to the storage tank by means of the drain pipe just described. The measuring attachment is supported preferably at a distance above the pump by means of a suitable standard 30, which is securely fastened to the base plate 18 of the measuring vessel at one end, and the other end thereof being designed to fit the top of the pump, so that the entire attachment may be rigidly and firmly attached in position, substantially as shown in Fig. 1 of the drawings. The glass cylinder of the measuring vessel is preferably surrounded by a suitable open mesh wire cage 31, so as to protect the same from breakage, while at the same time permitting the gasolene, as the same rises and falls within the measuring vessel, to be clearly observed.

In the embodiments of the invention illustrated in the drawings the measuring vessel is preferably graduated, as shown at 32, to read in terms of gallons, the full capacity of the measuring vessel, as limited by the position of the stand-pipe therein, being, in the form shown, five gallons. Any excess of this amount may be quickly returned to the storage tank in the manner above pointed out.

In Fig. 4 of the drawings a slightly modified form of measuring attachment is illustrated, said attachment being better adapted for use in connection with certain types of dispensing pumps other than the one shown in Fig. 1. In this form of measuring attachment a stand-pipe 34 is provided which is used only as an overflow pipe, the liquid being pumped into the measuring vessel through a supply pipe 33, which terminates adjacent the inner surface of the base plate 35 of the vessel, and is provided with suitable openings, so that the liquid may readily flow from said pipe into the vessel. The other features of this construction are substantially the same as described in connection with the preferred embodiment of the invention, and further description of this modification may, therefore, be dispensed with.

In using the attachment shown in Fig. 1, all of the valves are closed, and the pumping mechanism then actuated, whereupon the gasolene or other liquid will be supplied to the measuring vessel through the apertured cap 24 on the upper end of the stand-pipe 23. Upon the gasolene rising to a level above the top of the pipe 23, the pumping operation is stopped and the valve 26 provided in the supply pipe 20 opened, thereby draining the excess liquid back into the storage tank. The nozzle 28ª of the delivery hose is then inserted into the fuel tank of the automobile, and the valve 28ᵇ opened, whereupon the measured quantity of gasolene drains into said tank. The purpose of the valved drain pipe 29 has already been pointed out. The measuring of gasolene by means of the measuring attachment shown in Fig. 4 is accomplished in substantially the same manner as just described in connection with the attachment illustrated in Fig. 1, substantially the only difference in the two operations being that the measuring vessel of the modification is filled by means of a pipe separate and distinct from the overflow pipe.

It will, of course, be understood that the measuring attachment herein described is not necessarily intended to take the place of the measuring mechanism of the pump, but is merely designed to indicate visually the correctness of the quantities delivered by the latter. Thus the numerous well-known conveniences and advantages of the measuring pump mechanism may be retained, while at the same time the additional advantages provided by the auxiliary measuring attachment herein described are also obtained. While, as above stated, the measuring attachment herein described is not intended to take the place of the pump measuring mechanism, yet, if so desired, in view of the fact that the present attachment provides an efficient and accurate measure for the gasolene, such pump-measuring mechanism may be discarded. It will be observed, in the event both the pump measuring mechanism and the present attachment are employed, however, that the two operate wholly independently, and that during such operation each serves as a check upon the other.

It is obvious that various changes and modifications may be made in the embodiments of the invention herein illustrated and described without departing from the spirit of the invention, and accordingly it is not desired to limit the invention, except where limitations appear in the appended claims.

I claim:—

1. The combination with a liquid dispensing pump having a discharge pipe and means for forcing liquid therethrough, of a measuring vessel for said pump, a pipe connected to said discharge pipe and extending upwardly into said vessel, said pipe being provided with an outlet in said vessel corresponding to a predetermined level therein, and means whereby any liquid pumped into said vessel in excess of said level may be drained back to the storage tank through said pipe.

2. An apparatus of the type described, comprising a liquid measuring pump having a discharge outlet and means for forcing liquid through said outlet, a measuring vessel of transparent material secured to said pump above said outlet and provided with a supply pipe adapted to be connected to said outlet whereby liquid may be pumped into said vessel, said pipe extending to a point adjacent the top of said vessel, and means whereby any liquid in excess of a predetermined measured quantity may be returned from said vessel to the storage tank of said apparatus through said supply pipe.

3. In an attachment of the type described, a measuring vessel, an overflow pipe screw-threadedly mounted in the base of said vessel and extending upwardly into the same, said pipe being open at its upper end and provided with an apertured cap whereby liquid in excess of a predetermined quantity may be drained from said vessel through said pipe, and a slot in the top of said cap adapted to be engaged by a suitable tool whereby said pipe may be adjusted longitudinally within said vessel.

4. In an attachment of the type described, a measuring vessel, an overflow pipe screw-threadedly mounted in the base of said vessel and extending upwardly into the same, said pipe being open at its upper end and provided with an apertured cap whereby liquid in excess of a predetermined quantity may be drained from said vessel through said pipe, a slot in the top of said cap adapted to be engaged by a suitable tool whereby said pipe may be adjusted longitudinally within said vessel, the top of said vessel being provided with an opening immediately above said cap for the insertion of such tool, and a removable closure for said opening.

5. The combination with a liquid pump having a discharge pipe, of a measuring attachment for said pump comprising a measuring vessel of transparent material adapted to be mounted on said pump, a supply pipe for said vessel connected to said discharge pipe, an overflow pipe adapted to drain liquid in excess of a predetermined quantity from said vessel, means for delivering the measured quantity of liquid from said vessel to a receiving tank, and a valved drain pipe for said vessel connected to said supply pipe.

6. The combination with a liquid dispensing pump having a discharge pipe and means for causing liquid to flow therethrough, of a measuring vessel for said pump, a pipe connected to said discharge pipe and extending upwardly into said vessel, said pipe being provided with an outlet in said vessel corresponding to a predetermined level therein, and means whereby any liquid flowing into said vessel in excess of said level may be drained back to the storage tank through said pipe.

7. In combination, a main reservoir, an auxiliary reservoir, a pipe connecting said reservoirs, means for causing liquid to flow through said pipe from said main reservoir to said auxiliary reservoir, a tubular member communicating with said pipe and extending upwardly into said auxiliary reservoir and having an opening therein to determine the level of the liquid in said auxiliary reservoir, a branch pipe communicating at opposite ends with said first pipe and with said main reservoir respectively, and means in said branch pipe for controlling the flow of excess liquid from said auxiliary reservoir to said main reservoir.

8. In combination, a main reservoir, an auxiliary reservoir above the same, a pipe connecting the two, means for raising liquid through said pipe from said main reservoir to said auxiliary reservoir, a branch pipe connected to said first pipe and said main reservoir, whereby excess liquid in said auxiliary reservoir may be drained back to said main reservoir through said branch pipe and part of said first pipe, and a valve in said branch pipe for regulating said flow.

In testimony whereof, I have subscribed my name.

JOSEPH J. GROETKEN